(12) United States Patent
Burczyk

(10) Patent No.: US 9,096,190 B2
(45) Date of Patent: Aug. 4, 2015

(54) BELT STRAP FOR A SAFETY BELT SYSTEM

(71) Applicant: Daimler AG, Stuttgart (DE)

(72) Inventor: Christian Burczyk, Stuttgart (DE)

(73) Assignee: Daimler AG, Stuttgart (DE)

( * ) Notice: Subject to any disclaimer, the term of this patent is extended or adjusted under 35 U.S.C. 154(b) by 0 days.

(21) Appl. No.: 14/356,442

(22) PCT Filed: Oct. 16, 2012

(86) PCT No.: PCT/EP2012/004314
§ 371 (c)(1),
(2) Date: May 6, 2014

(87) PCT Pub. No.: WO2013/068071
PCT Pub. Date: May 16, 2013

(65) Prior Publication Data
US 2014/0312601 A1   Oct. 23, 2014

(30) Foreign Application Priority Data
Nov. 9, 2011   (DE) .......................... 10 2011 118 110

(51) Int. Cl.
*B60R 21/18*   (2006.01)

(52) U.S. Cl.
CPC ....................................... *B60R 21/18* (2013.01)

(58) Field of Classification Search
CPC ........................................................ B60R 21/18
USPC ............................................................ 280/733
See application file for complete search history.

(56) References Cited

U.S. PATENT DOCUMENTS

| | | | |
|---|---|---|---|
| 3,801,156 A | | 4/1974 | Granig |
| 3,866,940 A | | 2/1975 | Lewis |
| 3,888,503 A | * | 6/1975 | Hamilton ................. 280/733 |
| 3,975,258 A | * | 8/1976 | Fox ........................... 280/733 |
| 5,445,411 A | * | 8/1995 | Kamiyama et al. ....... 280/733 |
| 6,135,563 A | * | 10/2000 | Yoshioka .................. 297/470 |
| 6,142,511 A | * | 11/2000 | Lewis ........................ 280/733 |
| 6,170,863 B1 | * | 1/2001 | Takeuchi et al. .......... 280/733 |
| 6,340,173 B1 | * | 1/2002 | Specht ....................... 280/733 |
| 6,419,263 B1 | * | 7/2002 | Busgen et al. ............. 280/733 |
| 6,631,923 B2 | * | 10/2003 | Eckert et al. .............. 280/743.1 |

FOREIGN PATENT DOCUMENTS

DE   100 46 268 B4   6/2011

OTHER PUBLICATIONS

International Search Report dated Nov. 22, 2012 with English translation (five (5) pages).
German-language Written Opinion (PCT/ISA/237) Nov. 22, 2012 (five (5) pages).

* cited by examiner

*Primary Examiner* — Drew Brown
(74) *Attorney, Agent, or Firm* — Crowell & Moring LLP

(57) ABSTRACT

A webbing includes, in the longitudinal direction, an expansion region having a first webbing width and a connection region having a second webbing width. The second webbing width is thinner than the first webbing width. In a state of use the webbing is folded up into a winding width, which is thinner than the second webbing width. The second webbing width is an integral multiple of the winding width.

7 Claims, 3 Drawing Sheets

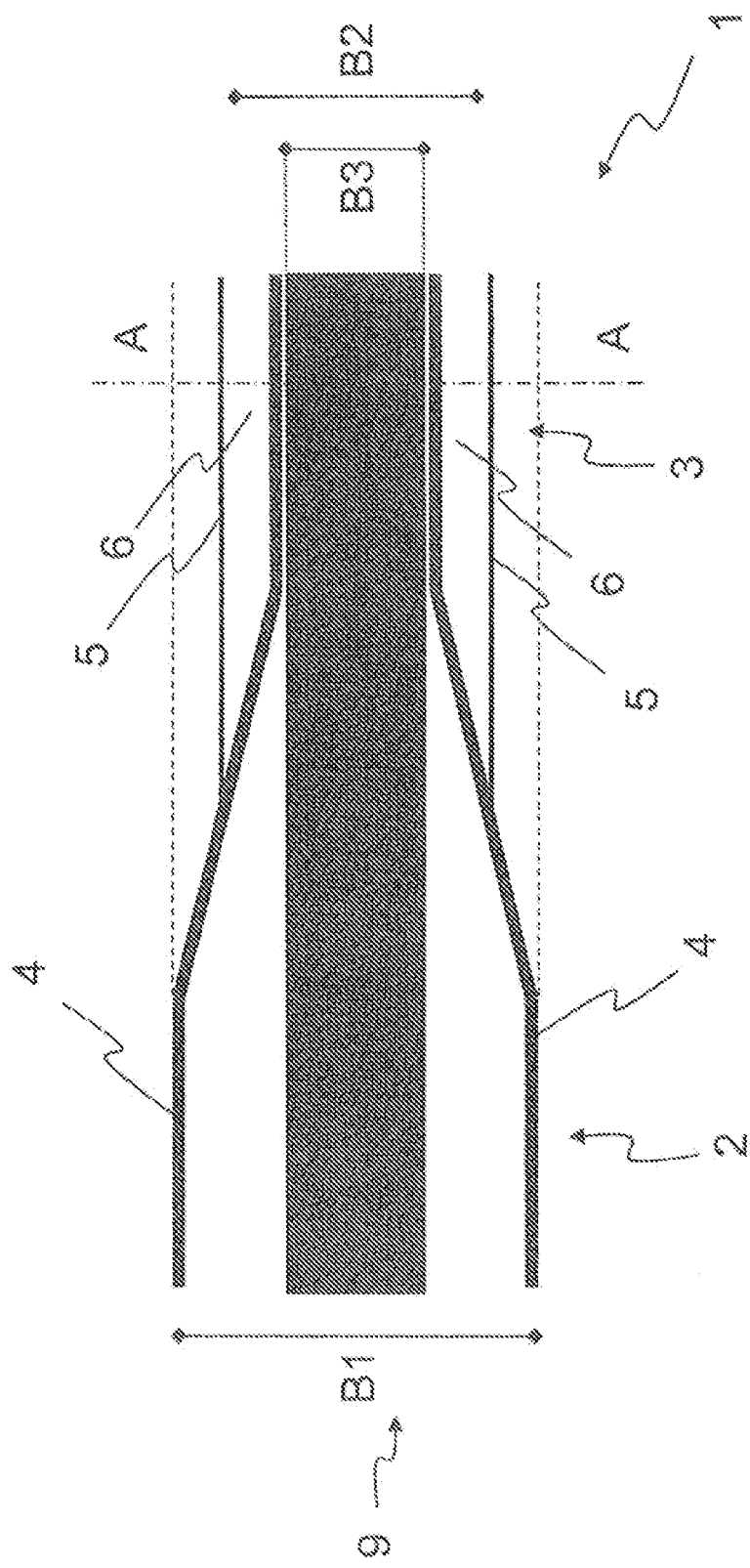

Figure 4:
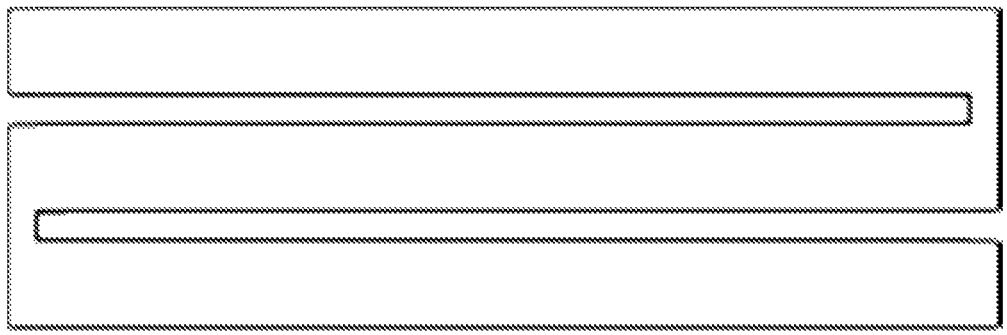

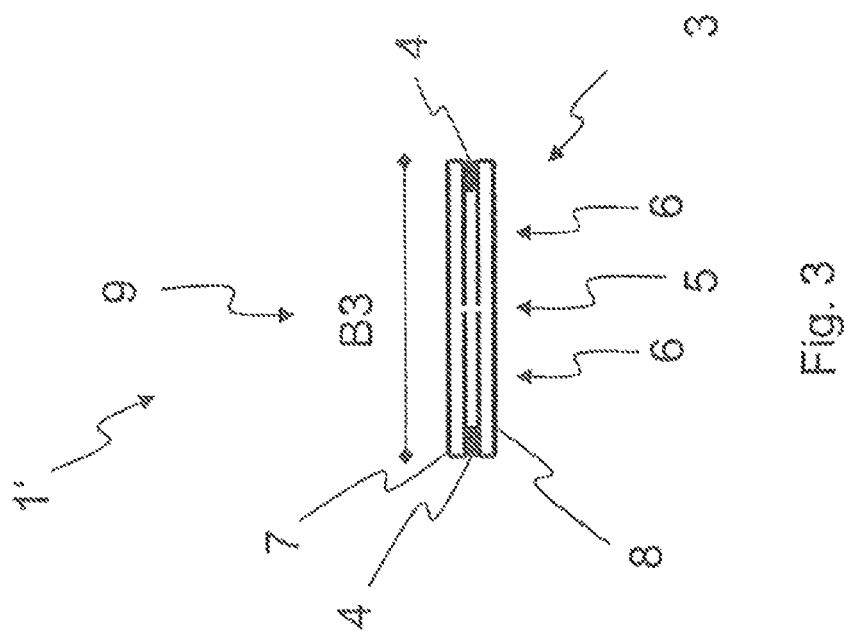
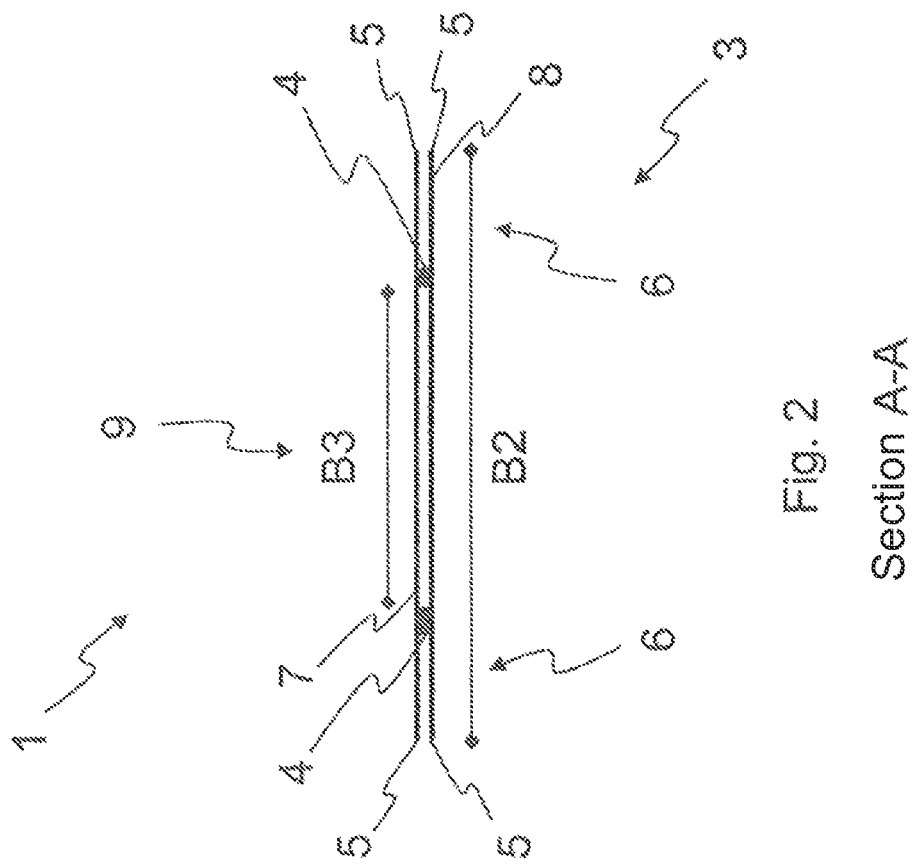

BELT STRAP FOR A SAFETY BELT SYSTEM

BACKGROUND AND SUMMARY OF THE INVENTION

Exemplary embodiments of the invention relate to a webbing for a safety belt system.

German patent document DE 100 46 268 B4 discloses a generic gas belt comprising a belt and a sack, wherein, in the longitudinal direction, half of the belt is a hollow inflatable section and the other half is a fixed non-inflatable section. The inflatable and the non-inflatable sections are woven or knitted into the shape of unit. The inflatable section is wider than the non-inflatable section in a non-extended state. A width of the gas belt decreases gradually in the non-extended state, starting from the inflatable section moving in towards the non-inflatable section. The sack is arranged in the inflatable section and gas is supplied to the sack to extend the gas belt. In addition to the gas belt, a gas belt device can have a retraction device to wind up the gas belt.

Exemplary embodiments of the invention provide an improved webbing for a safety belt system.

The device according to the invention has a webbing, which comprises an expansion region and a connection region arranged in the longitudinal direction. The webbing is situated first in an intermediate production state. The expansion region has a first webbing width and the connection region has a second webbing width. The second webbing width is thinner than the first webbing width. The webbing is folded up into a winding width in a state of use, wherein the winding width is thinner than the second webbing width and the second webbing width is an integral multiple of the winding width. The webbing is, in particular, intended for use in a safety belt system having an inflatable webbing.

The webbing is unfolded first in the intermediate production state in a substantially flat manner, wherein the width of the expansion region, measured transversely to the longitudinal extension, is larger than the width of the connection region. The expansion region is provided to support a passenger secured with the webbing, for example in a motor vehicle, as extensively as possible, in particular in the case of an accident. The connection region is provided to connect the expansion region to a fixing point. A fixing point can, for example, be a body or a seat of a motor vehicle, wherein the connection can occur using normal devices, such as, for example, using a webbing reel or using an end fitting.

The webbing, which is flat in the intermediate production state, is folded up into a winding width to produce the state of use, wherein the winding width is thinner than the second webbing width and the second webbing width is an integral multiple of the winding width. The winding width is preferably suited to be able to wind up the webbing situated in its state of use into the webbing reel of the safety belt system.

The proposed webbing offers the advantage that it has an even thickness measured along the width in its state of use despite regions arranged in the longitudinal direction of different widths in the intermediate production state. Using this even thickness determined along the winding width, the proposed webbing can be rolled up in its state of use particularly advantageously, for example by the webbing reel with winding layers that lie evenly one on top of the other.

In a preferred embodiment, the webbing has a tubular region, which runs from the expansion region to the connection region. In the case of such a tubular webbing, it can be advantageous to additionally invert the webbing to produce the state of use, which can occur before, during or after the webbing is folded up. In this way, the webbing can be designed to be able to wind up in an even better manner, or an optic or haptic quality of the webbing can be increased. In one embodiment, the tubular region is formed by an upper webbing layer and a lower webbing layer which are connected to each other on both sides along their longitudinal extension. The upper and the lower webbing layers can, of course, be connected to each other in one piece, in particular if these are produced by means of a so-called "one-piece woven" method. Alternatively, a separate upper webbing layer and a separate lower webbing layer can be connected to each other, for example by stitching.

In one embodiment, the connection region has at least one additional compensation overhang on the side of the tubular region. Using the at least one additional compensation overhang, the proposed conditions for the first and second webbing widths and for the winding width can be particularly simply met. In the case of a predetermined first webbing width and a predetermined winding width, the width of the compensation overhang can be pre-determined in a simple way, such that the second webbing width is an integral multiple of the winding width. In one embodiment, the connection region can, of course, also have an additional compensation overhang on both sides of the tubular region respectively.

In one embodiment of the webbing in a state of use, lateral edges of the connection region of the webbing that is folded up into the winding width lie adjacent to one another in an inverted intermediate production state, without overlapping one another. In its state of use, such a webbing has fundamentally even webbing thickness measured along the winding width, whereby in particular, the webbing is able to be wound up particularly evenly. In one development, a small gap is advantageous between the lateral edges, for example, to be able to compensate for production-related tolerances.

In one development, the tubular region of the connection region of the webbing folded up into the winding width encloses the at least one compensation overhang. In this way, the compensation overhang is protected, for example, from mechanical damage. Additionally, an optically appealing webbing in the state of use is achieved in a simple way.

In one specific embodiment, the webbing folded up into the winding width has six layers that lie one on top of the other in the expansion region and four layers that lie one on top of the other in the connection region. The six layers that lie one on top of the other in the expansion region can, for example, be combined in a z-shape in a known way, wherein lateral rip seams can releasably fix the fold. Superfluous material, and therefore weight, which is not necessary for the function of the webbing, is saved using the four layers that lie one on top of the other in the connection region.

In principle, the webbing for the intermediate production state can be directly produced with the required dimensions. Alternatively, the webbing for the intermediate production state can be produced with dimensions that deviate from this, such as, for example, a uniform width along its extension, whereby necessary adaptations, for example of the second webbing width, occur in a further production step, for example by cutting the webbing.

In one specific embodiment, the webbing is woven or knitted in one piece. This can, for example, occur in the "one-piece woven" method, using which the webbing is able to be produced in a simple way. Also in the case of a webbing that is woven or knitted in one piece, an adaptation of at least one dimension of the webbing, for example the second webbing width, can be necessary in a further production step, for example by cutting the webbing.

In a preferred embodiment, the expansion region is inflatable, for example, in order to be able to better support a passenger of a motor vehicle secured by means of the webbing in the case of an accident. An inflatable expansion region can, for example, be depicted using an inflatable air sack allocated to the expansion region or using a design of the expansion region that is at least partially tubular and gas-tight.

Exemplary embodiments of the invention are also directed to a safety belt system comprising a webbing according to the invention having an inflatable expansion region, a gas generator to inflate the expansion region and a webbing reel to at least partially wind up at least the connection region. This type of safety belt system is, for example, known by the term "belt bag", and are safety belt systems having an at least partially inflatable webbing. If the webbing according to the invention has the tubular region, the gas of the gas generator can be supplied to the inflatable expansion region in order to inflate the expansion region by means of the gas, in the case of an activation of the safety belt system, for example in the case of an accident, by the tubular region running into the connection region. The webbing reel winds up the unnecessary webbing in a known way, which is possible due to the even thickness of the webbing along its winding width, without causing lateral displacement of the webbing during winding, as can occur in the case of webbing that has an uneven thickness along its winding width.

BRIEF DESCRIPTION OF THE DRAWING FIGURES

One embodiment of the present invention is described in an exemplary manner with reference to the drawings.

Herein is shown:

FIG. 1 a top view onto a section of a webbing in an intermediate production state;

FIG. 2 a cross-section according to A-A of the webbing from FIG. 1;

FIG. 3 a cross-section of the webbing in a state of use, obtained by inverting and folding the webbing from FIG. 2;

FIG. 4 a cross-section of the expansion region of the webbing in a state of use.

DETAILED DESCRIPTION

In FIG. 1, for example, a section of a webbing 1 is depicted in an intermediate production state. The webbing 1 has an expansion region 2 and a connection region 3. The expansion region 2 has a first webbing width B1 and the connection region 3 has a second webbing width B2. The second webbing width B2 is thinner than the first webbing width B1. A winding width B3 is marked in FIG. 1, into which the webbing 1 is folded in a production step. The winding width B3 is thinner than the second webbing width B2. The second winding width B2 is approximately double the width of the winding width B3.

The webbing 1 has a tubular region 9, which runs from the expansion region 2 to the connection region 3. The tubular region 9 is formed by an upper webbing layer 7 and a lower webbing layer 8, as is depicted for the connection region 3 in the cross-section from FIG. 2. The two webbing layers 7, 8 are connected to each other on both sides on a connection line 4 along their longitudinal extension.

The connection region 3 has, laterally, a respective additional compensation overhang 6 on both sides of the tubular region 9, such that the second webbing width B2 bordered by the edges 5 is approximately double the width of the winding width B3. It can be advantageous for the production of the webbing 1 that the webbing 1 continually has the width B1 in a state preceding the intermediate production state. In this case, the superfluous webbing material between the edges 5 of the connection region and the dashed outer line is removed, for example by cutting the webbing 1, to achieve the intermediate production state depicted in FIG. 1.

In FIG. 2, the webbing 1 is depicted in a cross-section from A to A in the connection region 3. This webbing 1 that is still situated in the intermediate production state is transferred into the state of use depicted in FIG. 3, in that the webbing 1 is inverted, whereby the lateral compensation overhangs 6 are folded inwards and are enclosed by the webbing 1 now situated in the state of use.

The lateral edges 5 of the connection region 3 lie adjacent to one another without overlapping one another. The connection region 3 depicted in FIG. 3 has four layers that lie one on top of the other. A cross-section of the expansion region 2 that is depicted in FIG. 4 has six layers in a z-shaped fold of the expansion region 2. The layers of the compensation overhangs 6 enclosed by the webbing 1, 1' can either not be connected to one another or be partially or also completely connected to one another. In the case of layers that are not connected to one another, the webbing can be more flexible in the state of use. A wrinkling, for example, can be reduced or prevented using layers connected to one another.

In principle, in one development, the lateral edges 5 of the connection region 3 can at least partially have a shape that deviates from the straight course. Examples for such a shape are a triangular shape or, in particular, a wave shape. One exemplary embodiment for a wave shape is a sinusoidal wave, which can either have an even course of an oscillation having a fixed frequency or an irregular course of an oscillation having a changing frequency.

If the webbing 1, 1' is woven in one piece, for example by means of the "one-piece woven" method, then the upper webbing layer 7 and the lower webbing layer 8 are interwoven with each other in one piece in the region of the connection line 4.

The webbing 1' that fundamentally has an even thickness along the winding width B3 can, as is mentioned in more detail above, be wound up into a webbing reel that is not depicted in the drawing, whereby, for example, forces acting laterally on a housing of the webbing reel can be reduced, said forces in particular being able to occur more strongly in the case of an irregularly wound webbing. Furthermore, the effect of a normal reel tensioner is better with a regularly wound webbing than an irregularly wound webbing as the force of the reel tensioner can be transferred more directly to the webbing. Finally, only as much material is used for the webbing 1,1' as is necessary for the function using the solution according to the invention.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

The invention claimed is:

1. A webbing in an intermediate production state, comprising:
    an upper webbing layer; and
    a lower webbing layer,
    wherein the upper and lower webbing layers are connected by a first and second connecting line along their longitudinal extension to form in a longitudinal direction, an expansion region having a first webbing width; and in the longitudinal direction, a connection region having a second webbing width, wherein a tubular region runs from the expansion region to the connection region, wherein the connection region includes a compensation overhang on both sides of the tubular region, wherein the first and second connecting lines connect edges of the upper and lower webbing layers in the expansion region and the first and second connecting lines are arranged between the compensation overhang and the tubular region in the connection region, wherein the second webbing width is thinner than the first webbing width, wherein in a state of use the webbing is folded up into a winding width, wherein the winding width is thinner than the second webbing width, and the second webbing width is an integral multiple of the winding width.

2. The webbing of claim 1, wherein in a state of use in the webbing is inverted from the intermediate production state so that lateral edges of the connection region of the webbing that is folded up into the winding width are adjacent to one another without overlapping one another.

3. The webbing of claim 2, wherein the tubular region of the connection region of the webbing that is folded up into the winding width encloses the compensation overhang.

4. The webbing of claim 3, wherein the webbing folded up into the winding width has six layers that lie one on top of the other in the expansion region and four layers that lie one on top of the other in the connection region.

5. The webbing of claim 1, wherein the webbing is woven or knitted in one piece.

6. The webbing of claim 1, wherein the expansion region is inflatable.

7. A safety belt system, comprising:

an inflatable webbing in an intermediate production state, comprising an upper webbing layer; and a lower webbing layer, wherein the upper and lower webbing layers are connected by a first and second connecting line along their longitudinal extension to form in a longitudinal direction, an expansion region having a first webbing width; and in the longitudinal direction, a connection region having a second webbing width, wherein a tubular region runs from the expansion region to the connection region, wherein the connection region includes a compensation overhang on both sides of the tubular region, wherein the first and second connecting lines connect edges of the upper and lower webbing layers in the expansion region and the first and second connecting lines are arranged between the compensation overhang and the tubular region in the connection region, wherein the second webbing width is thinner than the first webbing width, wherein in a state of use the webbing is folded up into a winding width, wherein the winding width is thinner than the second webbing width, and the second webbing width is an integral multiple of the winding width;

a gas generator coupled to the inflatable webbing and configured to inflate the expansion region of the inflatable webbing; and a webbing reel for configured to at least partially wind at least the connection region of the inflatable webbing.

* * * * *